(12) United States Patent
Shamis et al.

(10) Patent No.: US 12,001,722 B2
(45) Date of Patent: Jun. 4, 2024

(54) TECHNIQUE FOR CONTROLLING STASHING OF DATA

(71) Applicant: Arm Limited, Cambridge (GB)

(72) Inventors: Pavel Shamis, Austin, TX (US); Honnappa Nagarahalli, Austin, TX (US); Jamshed Jalal, Austin, TX (US)

(73) Assignee: Arm Limited, Cambridge (GB)

(*) Notice: Subject to any disclaimer, the term of this patent is extended or adjusted under 35 U.S.C. 154(b) by 111 days.

(21) Appl. No.: 17/890,456

(22) Filed: Aug. 18, 2022

(65) Prior Publication Data

US 2024/0061613 A1   Feb. 22, 2024

(51) Int. Cl.
*G06F 3/06* (2006.01)

(52) U.S. Cl.
CPC .......... *G06F 3/0659* (2013.01); *G06F 3/0604* (2013.01); *G06F 3/0635* (2013.01); *G06F 3/0673* (2013.01)

(58) Field of Classification Search
CPC .... G06F 3/0659; G06F 3/0604; G06F 3/0635; G06F 3/0673
USPC .......................................................... 711/154
See application file for complete search history.

(56) References Cited

U.S. PATENT DOCUMENTS

| | | | |
|---|---|---|---|
| 10,452,593 B1 * | 10/2019 | Jalal ...................... G06F 13/382 |
| 10,733,106 B2 * | 8/2020 | Shamis ............... G06F 12/0824 |
| 10,949,292 B1 * | 3/2021 | Mathewson ........ G06F 11/1016 |
| 11,314,645 B1 * | 4/2022 | Dunham ............. G06F 12/0835 |
| 2011/0029586 A1 * | 2/2011 | Nichols ................. G06F 16/185 707/E17.107 |
| 2016/0004654 A1 * | 1/2016 | Dutta ...................... G06F 12/00 710/308 |
| 2019/0114262 A1 * | 4/2019 | Dimond ................ G06F 9/4843 |
| 2019/0129857 A1 | 5/2019 | Shamis et al. |
| 2019/0129871 A1 * | 5/2019 | Carro ................... G06F 12/0811 |
| 2021/0306414 A1 * | 9/2021 | Beard ................. G06F 12/0826 |
| 2021/0374059 A1 * | 12/2021 | Joao .................... G06F 12/0833 |
| 2021/0400124 A1 * | 12/2021 | Pardo .................... H04L 69/324 |
| 2022/0327009 A1 * | 10/2022 | Beard ................. G06F 12/1009 |
| 2022/0327057 A1 * | 10/2022 | Beard .................. G06F 12/109 |

* cited by examiner

*Primary Examiner* — Christopher B Shin

(74) *Attorney, Agent, or Firm* — NIXON & VANDERHYE P.C.

(57) ABSTRACT

There is provided an apparatus, method, and computer-readable medium. The apparatus comprises interconnect circuitry to couple a device to one or more processing elements and to one or more storage structures. The apparatus also comprises stashing circuitry configured to receive stashing transactions from the device, each stashing transaction comprising payload data and control data. The stashing circuitry is responsive to a given stashing transaction whose control data identifies a plurality of portions of the payload data, to perform a plurality of independent stashing decision operations, each of the plurality of independent stashing decision operations corresponding to a respective portion of the plurality of portions of payload data and comprising determining, with reference to the control data, whether to direct the respective portion to one of the one or more storage structures or whether to forward the respective portion to memory.

19 Claims, 7 Drawing Sheets

TECHNIQUE FOR CONTROLLING STASHING OF DATA

TECHNICAL FIELD

The present invention relates to data processing. More particularly the present invention relates to an apparatus, a method and a non-transitory computer-readable medium to store computer-readable code for fabrication of an apparatus.

BACKGROUND

Some apparatuses are provided with stashing circuitry to receive stashing transactions comprising payload data from devices and to perform stashing decision operations to determine whether to stash the payload data in a storage structure or whether to forward the payload data to memory.

SUMMARY

In a first example configuration described herein there is an apparatus comprising:
interconnect circuitry to couple a device to one or more processing elements and to one or more storage structures; and
stashing circuitry configured to receive stashing transactions from the device, each stashing transaction comprising payload data and control data;
wherein the stashing circuitry is responsive to a given stashing transaction whose control data identifies a plurality of portions of the payload data, to perform a plurality of independent stashing decision operations, each of the plurality of independent stashing decision operations corresponding to a respective portion of the plurality of portions of payload data and comprising determining, with reference to the control data, whether to direct the respective portion to one of the one or more storage structures or whether to forward the respective portion to memory.

In a second example configuration described herein there is a method of operating an apparatus comprising interconnect circuitry to couple a device to one or more processing elements and to one or more storage structures, the method comprising:
receiving stashing transactions from the device, each stashing transaction comprising payload data and control data; and
performing, in response to a given stashing transaction whose control data identifies a plurality of portions of the payload data, a plurality of independent stashing decision operations, each of the plurality of independent stashing decision operations corresponding to a respective portion of the plurality of portions of payload data and comprising determining, with reference to the control data, whether to direct the respective portion to one of the one or more storage structures or whether to forward the respective portion to memory.

In a further example configuration described herein there is a non-transitory computer-readable medium to store computer-readable code for fabrication of an apparatus comprising:
interconnect circuitry to couple a device to one or more processing elements and to one or more storage structures; and
stashing circuitry configured to receive stashing transactions from the device, each stashing transaction comprising payload data and control data;
wherein the stashing circuitry is responsive to a given stashing transaction whose control data identifies a plurality of portions of the payload data, to perform a plurality of independent stashing decision operations, each of the plurality of independent stashing decision operations corresponding to a respective portion of the plurality of portions of payload data and comprising determining, with reference to the control data, whether to direct the respective portion to one of the one or more storage structures or whether to forward the respective portion to memory.

BRIEF DESCRIPTION OF THE DRAWINGS

The present invention will be described further, by way of example only, with reference to configurations thereof as illustrated in the accompanying drawings, in which.

DESCRIPTION OF EXAMPLE CONFIGURATIONS

Figure 1:
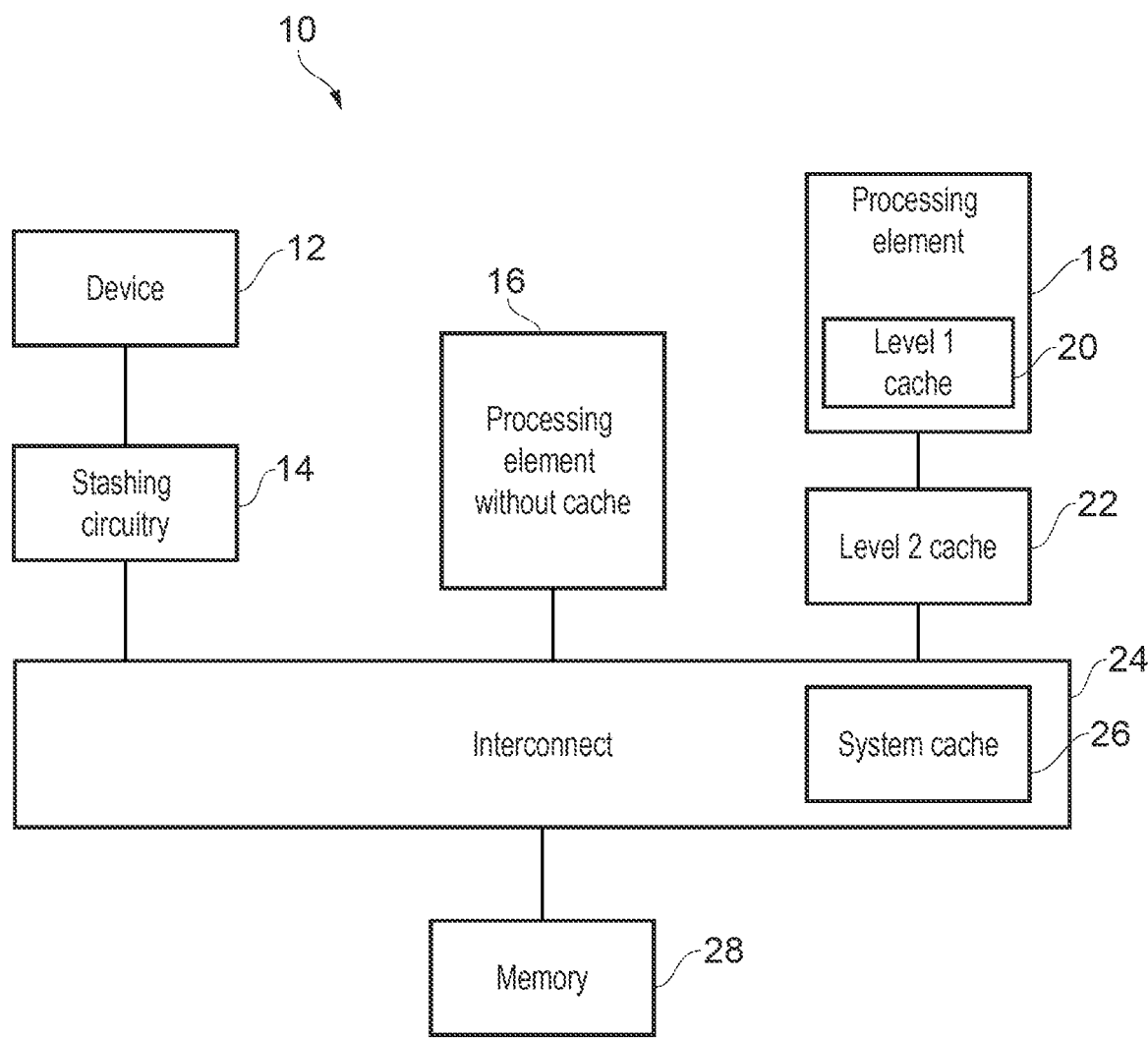
FIG. 1 schematically illustrates an apparatus according to various configurations of the present techniques.

Before discussing example configurations with reference to the accompanying figures, the following description of configurations is provided.

In accordance with some configurations there is provided an apparatus comprising interconnect circuitry to couple a device to one or more processing elements and to one or more storage structures. The apparatus is also provided with stashing circuitry configured to receive stashing transactions from the device, each stashing transaction comprising payload data and control data. The stashing circuitry is responsive to a given stashing transaction whose control data identifies a plurality of portions of the payload data, to perform a plurality of independent stashing decision operations, where each of the plurality of independent stashing decision operations corresponds to a respective portion of the plurality of portions of payload data and comprises determining, with reference to the control data, whether to direct the respective portion to one of the one or more storage structures or whether to forward the respective portion to memory.

A stashing transactions is a type of transaction which can be arranged to provide payload data and control data. Unlike a store/load transaction where the destination is determined by the memory management system, a stashing transaction may be directed, by the stashing circuitry, to either a storage structure (for example, one or more levels of cache) or to memory based on information indicated in the control data. Such transactions can be used by devices, for example, to cause data to be stored in a storage structure that is more easily accessed by a processing element that is anticipated, by the device, to require the payload data. The inventors have realised that, in some use cases, it may be preferable that one or more portions of payload data are directed to one or more storage structures and that a further one or more portions of the payload data are directed to either a different storage structure or to memory. In accordance with the techniques described herein, there is provided stashing circuitry that is responsive to stashing transactions having control data that identifies plural portions of the payload data, to perform plural independent stashing decision operations, one for each of the identified portions. The stashing decisions are independent of one another in that a result of one stashing decision corresponding to one portion of the payload data is not affected by and does not affect another stashing decision corresponding to another portion of the payload data. As a result, each identified portion of the payload data in the stashing transaction is separately considered for stashing in one or more storage structures, thereby providing a mechanism for reducing the required storage overhead associated with storing a stashing transaction in a storage structure rather than main memory. The stashing circuitry and the interconnect circuitry can be provided as discrete functional circuitry blocks or as a single combined circuit that provides the function of both the interconnect circuitry and the stashing circuitry.

In some configurations the control data of the given stashing transaction comprises portion identifying information indicating each of the plurality of portions of payload data, and the stashing circuitry is configured to identify each of the plurality of portions based on the portion identifying information. The portion identifying information may take a variety of forms, and in one example may comprise an indication of one or more boundaries between each of the plurality of portions of payload data. Purely by way of a specific example, the portion identifying information may comprise a single offset value indicating a number of bits (or a number of bytes) of payload data that are comprised in a first portion of the payload data with the bits (or bytes) that are comprised in a second portion of the payload data corresponding to each bit (or byte) of the payload data that is not comprised in the first portion of the payload data. Alternatively, purely by way of another specific example, the portion identifying information may comprise an indication identifying a plurality of equally sized portions of the payload data each of which is to be considered in an independent stashing decision operation.

The independent stashing decision operations are performed with reference to the control data which, in some configurations, comprises destination identifying information indicating a target destination for one or more of the plurality of portions of payload data. The stashing circuitry is configured, for each of the plurality of independent stashing decision operations that determines that the respective portion is to be directed to one of the one or more of storage structures, to determine, based on the destination identifying information, a particular storage structure of the one or more storage structures to which the respective portion is to be directed. The target destination can be provided as a common destination for a subset of the plurality of portions of payload data or as a common destination for each of the plurality of portions of payload data. Alternatively, the destination identifying information may indicate a plurality of respective target destinations, each corresponding to a different one of the plurality of portions of payload data. Whilst destination identifying information can be provided for each of the plurality of portions, in some configurations, the destination identifying information may only be provided for a subset of those portions. In such configurations, the stashing decision for each portion of the payload data for which the destination identifying information is not provided, may result in that portion of the payload data being directed to memory.

The target destination may comprise an indication of a particular storage structure to which the respective portion is to be directed. Alternatively, in some configurations the target destination identifies a processing element of the one or more processing elements that is expected to process the portion of the payload data, and the stashing circuitry is configured to determine, as the particular storage structure, a storage structure of the one or more storage structures that is accessible to the processing element. For example, the one or more storage structures may comprise one or more levels of cache including an L1 cache accessible to one or more of the processing elements, an L2 cache accessible to one or more of the processing elements, and a system cache accessible to one or more of the processing elements. The apparatus may also comprise storage structures that are inaccessible to particular processing elements. For example, one or more storage structures may be accessible to one processing element but may be inaccessible to another processing element. Furthermore, the different storage structures that are accessible to a given processing element may have different storage capacities and different access times. As a result, the content of a particular storage structure may be frequently changing due to different system demands associated with different processes that are utilising the storage structures at different times. By providing, as the target destination, a processing element of the one or more processing elements, the stashing circuitry is provided with a degree of flexibility as to which of the storage structures the payload data is to be directed and can determine the storage structure selection based on the varying usage requirements of that storage structure.

In some configurations the stashing circuitry is configured to perform each of the plurality of independent stashing decision operations based on current system conditions. The current system conditions can be specified in a variety of ways, but in one example implementation may comprise a usage metric of at least one of the one or more storage structures. The stashing circuitry can base the decision as to whether to stash a respective portion in one of the one or more storage structures, or to direct the respective portion to memory, based on the current system conditions.

In some configurations the stashing circuitry is configured, for each of the plurality of independent stashing decision operations that determines that the respective portion is to be directed to one of the one or more storage structures, to determine the particular storage structure based on the current system conditions. For example, the current system conditions may indicate that one or more of the storage structures that are accessible to a particular processing element, identified as a target destination, is currently being heavily used and that another storage structure that is accessible to the particular processing element is less heavily used. Based on this information, the stashing circuitry may direct the respective portion of payload data to the less heavily used other storage structure rather than the more heavily used storage structure.

The control data may be provided in relation to only a subset of the plurality of portions. In such configurations, the stashing circuitry is responsive to the absence of control data relating to the remaining subset of the plurality of portions to direct those portions of the plurality of portions to memory. Alternatively, in some configurations the control data comprises priority information indicating a stashing priority for one or more of the plurality of portions of payload data, and the stashing circuitry may be configured, when performing a respective stashing decision operation for the respective portion, to take into account any stashing priority provided for that respective portion. In other words, rather than providing a binary indication that a particular portion is to be stashed or not (for example, through the presence/absence of control data relating to the particular portion), the priority information provides a more fine grained indication as to which data is considered more likely to be required for processing by a processing element and, hence, should be beneficially placed in one of the one or more storage structures that is accessible to that processing element, and which data is considered less likely to be required by the processing element and hence for which the additional latency associated with retrieving that portion of payload data from memory for subsequent processing is less likely to be incurred.

In some configurations the priority information is only provided for portions of the plurality of portions that are considered for stashing. Alternatively, in some configurations the stashing circuitry is configured, for each of the plurality of portions for which the stashing priority indicates a lowest priority, to forward that portion to the memory. In other words, the lowest stashing priority is used to indicate that the respective portion of payload data is to be directed to memory rather than to be considered for stashing.

The stashing priority can be used to determine whether the respective portion is to be stashed or not to stashed. In addition, in some configurations the stashing circuitry is configured, when performing each of the plurality of independent stashing decision operations for which a stashing priority is indicated for the respective portion, to determine the particular storage structure based on the stashing priority.

In some configurations the one or more storage structures comprises a plurality of storage structures, the stashing priority is one of a higher priority or a lower priority, the processing element is coupled to a subset of the plurality of storage structures, each accessible to the processing element within a corresponding access time, the subset of the one or more storage structures comprises one or more shorter access time storage structures and one or more longer access time storage structures, the shorter access time storage structures having a shorter corresponding access time than the longer access time storage structures, and the stashing circuitry is configured, when performing each of the plurality of independent stashing decision operations for which a stashing priority is indicated for the respective portion, and when the stashing priority is the higher priority, to select, as the particular storage structure, one of the one or more shorter access time storage structures. The subset of the plurality of storage structures may comprise less than all of the storage structures, or may comprise the entire plurality of storage structures. The storage structures that are associated with the processing element may be arranged hierarchically with smaller storage structures placed close to the processing element to achieve a shorter access time and relatively larger storage structures placed further from the processing element (yet closer than the memory) resulting in access times that are longer than those associated with the smaller storage structures but that are shorter than the access times associated with memory. Portions of the plurality of portions for which the stashing priority indicates that the portion is a high priority portion are considered to be portions where it is highly likely that the processing element will require that portion of payload data for processing soon (i.e., within a relatively small number of processing cycles). In order to minimise latency associated with accessing that portion of payload data it would be advantageous to stash that portion of payload data in one of the storage structures that is close to the processing element. Hence, by selectively positioning the portions of payload data based on the priority indication, the stashing circuitry is able to provide high priority data to storage structures that are close to the processing circuitry resulting in increased system efficiency.

In some configurations the stashing circuitry is configured, when performing each of the plurality of independent stashing decision operations for which a stashing priority is indicated for the respective portion, and when the stashing priority is the lower priority, to select, as the particular storage structure, one of the one or more longer access time storage structures. Portions of the plurality of portions of payload data for which the stashing priority indicates that the portion is a lower priority portion are considered less likely to be required by the processing element, or at least in the relatively short term. If that portion of payload data were to be stashed in one of the storage structures that is closest to the processing element, that portion may be evicted from the storage structure before it is required resulting in unnecessary processing and power consumption. As shorter latency storage structures, such as those that are closest to a processing element, are typically space constrained, relative to longer latency storage structures, then stashing that portion of payload data in such a storage structure may also restrict the availability of that storage structure for other processes. Furthermore, it may also evict data that actually is required by the processing element, further impacting performance and power consumption. Hence, by storing the lower priority portions in one of the one or more longer access time storage structures, a reduced processing power overhead can be realised.

Whilst the stashing decision can be based on any number of the storage structures including all the storage structures, in some configurations the stashing circuitry is configured to determine a currently usable subset of storage structures comprising each of the subset of the plurality of storage structures for which a predetermined condition is met, and to select the particular storage structure from the currently usable subset of storage structures. The predetermined condition may take a variety of forms, and hence by way of example could be a fullness condition relating to an amount of available storage space in the storage structure, for example, expressed as a percentage or in terms of an absolute amount of storage space that is available so that the currently usable subset of storage structures (i.e., the subset of the storage structures that are deemed to be currently available for stashing) comprises only those storage structures that have an available amount of storage that exceeds a threshold amount of storage. The predetermined condition may, as another example, be a condition relating to how busy the storage structure is based on a frequency of accesses that have occurred over a recent time window, for example, the currently usable subset of storage structures may comprise only storage structures for which the frequency of accesses over the recent time window is below a threshold number of accesses. The predetermined condition being met may comprise a combination of both a usage criteria and a fullness criteria. The currently usable subset of the plurality of storage structures may be derived from the current system conditions. By only considering a currently usable subset of the storage structures, the stashing circuitry is able to exclude storage structures which are too full/busy to accept a stashing request or for which the storage structures would be able to accept a request but the likelihood that the stashed payload data is evicted before use becomes too high.

The payload data can be arranged in any format. However, in some configurations the payload data comprises a header portion and a data portion. The stashing circuitry may be arranged to determine a first storage structure of the one or more storage structures accessible by a first processing element of the one or more processing elements anticipated to process the header portion, and a second storage structure of the one or more storage structures accessible by a second processing element of the one or more processing elements anticipated to process the data portion, based on the control data, to store the header portion in the first storage structure, and to store the data portion in the second storage structure. The first processing element may comprise a data processor with its own caching structure (L1 cache, L2 cache) and, for some use cases, may not require the data portion of the payload data. Hence, the stashing circuitry is arranged to direct only the header portion to the first processing element. Furthermore, the data portion may be required by a second processing element, for example, an accelerator which may not be provided with its own cache structure and instead makes use of a system cache. Alternatively, the second processing element may be a further data processor with its own caching structure. In either case, the stashing processor is configured to stash the data portion and the header portion separately, thereby improving data locality for each of the first processing element and the second processing element.

In some configurations the device is a Peripheral Component Interconnect Express (PCIe) device and the stashing transaction is a PCIe transaction layer packet. PCIe is a widely-used packet protocol, and it is thus clearly advantageous for the present technique to be applicable within this Standard. However, it will be appreciated that the present technique is not limited to application within this Standard, and can in fact be applied within any type of network where the device is coupled to one or more processing elements via interconnect circuitry. A transaction layer packet (TLP) is used to communicate transactions within the PCIe protocol. TLPs contain a TLP header and TLP data. Typically, the TLP header may comprise 3 or 4 double words (32-bits) and the TLP data may comprise up to 1023 double words of data. Therefore, in some cases it may not be desirable to stash the entire data portion in a small storage structure that is located close to a processing element. Hence, the techniques described herein are particularly advantageous for TLPs where the data portion may be further broken down into a header portion and a data portion where the data portion may not be required for stashing. In particular, by choosing to stash only the header portion of the TLP data and not the data portion of the TLP data, the amount of data that is directed to a storage structure can be greatly reduced.

In some configurations the control data is stored in a PCIe steering tag of the transaction layer packet. The PCIe steering tag is a field defined in the PCIe Standard and can be used to provide hints to the micro-architecture regarding a destination of the TLPs. The steering tag can therefore be repurposed, whilst staying within the PCIe Standard, to provide the control data to the stashing circuitry. Hence, the use of the PCIe steering tag provides for an implementation that is compatible with PCIe.

The precise way in which the control information is encoded within the PCIe steering tag can be implementation dependent. However, in some configurations the PCIe steering tag encodes information indicative of a stashable portion of the payload data (for example, the header portion of the TLP data) and the stashing circuitry is configured to stash the stashable portion of the payload data in a first storage structure determined from the control data and to store each remaining bit of the payload data (for example, the data portion of the TLP data) in a second storage structure determined from the control data. The encoding can be achieved, for example, by encoding an integer N which defines that the first $2^N$ bits of the payload data correspond to the stashable portion and to define the remaining bits of the payload data as not corresponding to the stashable portion. Alternatively, the steering tag could be used to indicate one of a plurality of types of predefined stashing transaction to the stashing circuitry. For example, the stashing circuitry could store a plurality of predefined stashing options defining a number of different stashable portions and indicating a particular destination for those stashable portions. The steering tag can then be used to indicate one of the predefined stashing options to be used for a particular TLP.

The techniques described herein are not limited to PCIe, and any other suitable communication protocol could be used.

In some configurations the apparatus is a system on chip and the device is an off-chip device external to the system on chip. For example, the stashing techniques could be used for communication between multiple chips within a data processing system in order to improve data locality for transactions between the multiple chips.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular configurations will now be described with reference to the figures.

FIG. 1 schematically illustrates a data processing apparatus 10 according to various configurations of the present techniques. The data processing apparatus 10 comprises a processing element 18 which is provided with, as storage structures, a level 1 cache 20 and a level 2 cache 22, and a processing element 16 which is provided without a dedicated cache. The processing element 18 and the processing element without a dedicated cache 16 are connected via interconnect 24 which comprises, as a storage structure, a system cache 26 that is accessible to processing element 18 and the processing element without a dedicated cache 16. The data processing apparatus 10 is also provided with stashing circuitry 14 which is arranged between the interconnect 24 and a device 12. The device 12 is arranged to communicate with the processing element 18 and the processing element without a cache 16 via the stashing circuitry 14 and the interconnect 24. The data processing apparatus also comprises memory 28 which is accessible to the processing element 18, the processing element without a cache 16, and the stashing circuitry 14 via the interconnect 24.

Whilst the functional features of FIG. 1 are schematically illustrated as discrete circuit blocks, it would be readily apparent that this is for illustration purposes and that each of the blocks can be provided either as a discrete circuit block or in combination with one or more of the other logical blocks in a combined circuit that provides the function of each of the discrete logical blocks. For example, the stashing circuitry 14 may be provided as a discrete logical block that is separate from, yet connected to, the interconnect 24 or, alternatively, may be provided as a functional unit within the interconnect 24.

The stashing circuitry 14 is arranged to receive stashing requests (also referred to herein as stashing transactions) including control data and payload data from the device 12 and is configured to make stashing decisions based on the control data that is included in the stashing request. Based on the stashing decisions, the stashing circuitry 14 is arranged to direct the payload data to one of the storage elements (level 1 cache 20, level 2 cache 22, or system cache 26) or to direct the payload data to the memory 28. The stashing circuitry 14 is also responsive to stashing transactions for which the control data identifies a plurality of portions of the payload data to perform independent stashing decisions for each identified portion of the payload data.

Figure 2:
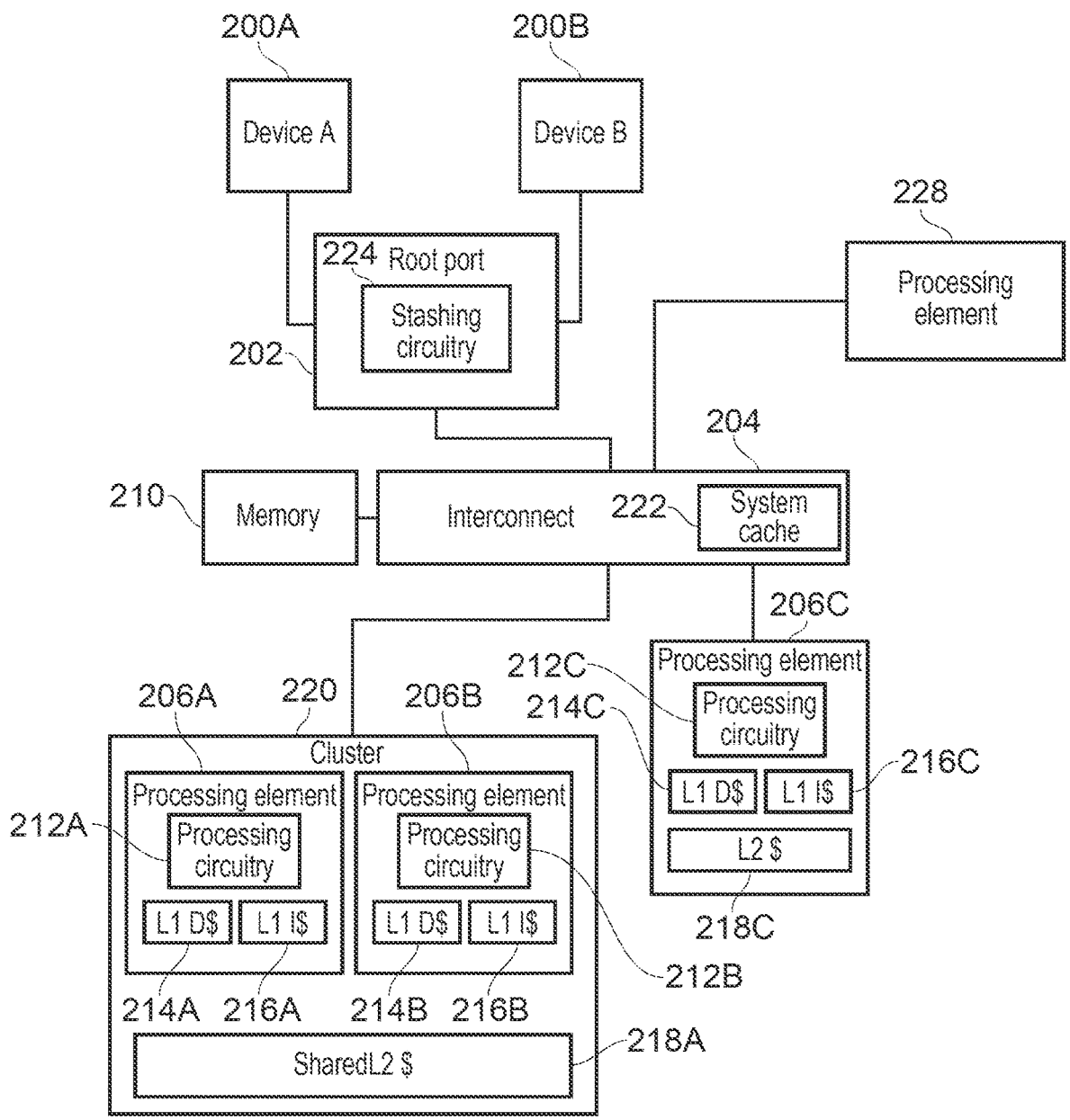
FIG. 2 schematically illustrates an apparatus according to various configurations of the present techniques.

FIG. 2 shows an example of a network of devices within which the present technique may be applied. In particular, FIG. 2 shows a number of devices 200 coupled via a root port 202 and an interconnect 204 to a number of processing elements (processor cores) 206, 228 and a memory 210. The interconnect 204 is an example of interconnect circuitry to couple a device (such as one of the devices 200 shown in the figure) to one or more processing elements (such as the processing circuitry 212A, 212B, 212C shown within the processing elements 206A, 206B, 206C shown in the figure). For example, the interconnect 204 could have the same or a similar configuration to the interconnect 24 shown in FIG. 1.

The interconnect 204 and the components connected to it, such as processing elements 206, may employ an interconnect communication protocol to exchange message between them. However, devices that operate in accordance with an alternative communication protocol, and which can hence be viewed as external devices to the subsystem containing the interconnect, can also connect to the interconnect, for example via the root port 202 shown in FIG. 2. By way of example, the devices 200A and 200B illustrated in FIG. 2 could communicate with the root port 202 using a packet network, and could employ a packet protocol of that packet network, such as the Peripheral Component Interconnect Express (PCIe) protocol. The root port hence acts as a bridge between the protocol used by the external devices 200A, 200B and the protocol employed by the interconnect and connected components connected thereto.

Each processing element 206, 228 comprises processing circuitry 212 and may be arranged identically to the processing elements 16, 18 shown in FIG. 1. The processing element is configured to execute program instructions including (for example) load/store instructions for accessing data stored in memory 210. Each processing element 206 has access to a plurality of caches, each storing copies of some of the data stored in the memory 210. In some examples, the caches shown in FIG. 2 may be equivalent to the cache 20 and the cache 22 illustrated in FIG. 1. The processing element 228 is not provided with its own caching structures and, instead, is arranged to access system cache 204. The processing element 228 may be equivalent to the processing element without a cache 16 illustrated in FIG. 1.

In particular, each processor block 206 comprise a level 1 data cache 214, for storing copies of data stored in memory 210, and a level 1 instruction cache 216, for storing copies of instructions stored in memory 210. Each processor block 206 may also have access to a unified level 2 cache 218, which stores copies of both data and instructions. Each of the unified level 2 caches 218 may be accessible to only one processor block 206—as in the example of processor block 206C, which incorporates its own level two cache 218C—or may be shared between multiple processor blocks 206—as in the example of processor blocks 206A and 206B, which are considered to be within the same cluster 220 of processor blocks, and share a level 2 cache 218A.

Accordingly, the storage structures of the network shown in FIG. 2 may have a hierarchical structure, with multiple levels of cache provided between the memory 210 and each of the sets of processing circuitry 212. The caches 214, 216, 218 may—as mentioned above—store copies of data or instructions stored in the memory 210. The data or instructions stored in the caches can then be accessed by the processing circuitry 212 with reduced latency. This reduced latency is the result, in part, of caches typically being significantly smaller than the main memory 210, so that looking up an address in one of the caches may be significantly quicker than looking up an address in memory. In addition, the caches are physically located closer to the processing circuitry 212 than the memory 210—in particular, the memory 210 is separated from the processing circuitry 212 by other components, such as the interconnect 204, whereas the caches 214, 216, 218 are not—which also reduces the latency associated with accessing the data held in the caches. Accordingly, allowing some data—especially data which is frequently accessed by the processing circuitry—to be stored in local caches allows the performance of each processor block 206 to be improved, by reducing the latency associated with data accesses.

As noted above, the system illustrated in FIG. 2 comprises multiple levels of caches. This is not essential—even providing a processing element with a single cache will provide some performance benefit—but it can be particularly advantageous as it allows significantly more data to be stored closer to the processing circuitry, without needing to increase the size of the level 1 cache 214. Typically, the level 1 cache 214 will store the data which has most recently been accessed by the processing circuitry 212 (and is thus most likely to be accessed again), and each subsequent level of cache will store data accessed less recently than the data stored in the previous cache levels.

The caches may be inclusive, meaning that data stored in one cache level is also stored in each subsequent cache level. Practically, this means that each cache beyond the level 1 cache stores all of the data (including instructions) stored in the previous cache level, and some additional data. This means that when an item of data is evicted from one cache (e.g. due to a cache replacement policy such as a least recently used (LRU) policy), it is likely to remain in the cache in the subsequent level. For example, if data is evicted from the level 1 data cache 214, it will remain in the level 2 cache 218 for at least some time after its eviction from the level 1 data cache 214. This means that, if the processing circuitry needs to access that data again after it has been evicted from the level 1 data cache 214 (but before it has been evicted from the level 2 cache), the data can still be accessed without needing to retrieve the data from memory, albeit with greater latency than if the data had been present in the level 1 data cache 214. Alternatively, the caches may be exclusive, meaning that a given item of data is stored in only cache level at a given time.

The choice of inclusive or exclusive caches is an implementation detail, which can be chosen based on the needs of the system. Moreover, it is not necessary for all of the caches in the system to be either inclusive or exclusive. Indeed, given data items within an inclusive cache may be treated as exclusive, such that they are stored in only one cache.

It will be appreciated that, while FIG. 2 only shows three levels of cache between the memory 210 and the processing circuitry 212 (L1 caches 214, 216, L2 caches 218, and system cache 204), there may be any number of levels of cache provided. Moreover, while the cache levels in FIG. 2 have been numbered such that the lowest number corresponds with the cache closest to the processing circuitry (i.e. level 1 is the closest to the processing circuitry 212, while level 2 is further from the processing circuitry 212 than level 1), it will be appreciated that this is merely a label, and any other choice of labelling could be used without implying a different functionality.

As mentioned above, the processor blocks 206 are connected to an interconnect 204, which allows them to communicate with the memory 210 and with the devices 200 via the root port 202. The devices 200 are connected to the interconnect 202 via a root port 202. In particular, the devices 200 and the root port 202 are provided within a hierarchical structure, with the root port 202 at a first level of devices connected directly to the interconnect 204, and the devices 200 connected to the interconnect via the root port. It will be appreciated that, while only a single root port is shown in FIG. 2, there may be multiple root ports provided. Moreover, while only two levels of devices are shown in the device network of FIG. 2 that comprises the devices 200 and the root port 202, there may be further levels of devices between the devices 200 and the root port 202, with each device in a given level connected to one of the devices in the previous level in a tree-like structure. In other examples, the devices 200 may even be connected directly to the interconnect 204, without an intervening root port.

One type of transaction which may be issued by the devices 200 is a stashing transaction. A stashing transaction comprises a request to access data in a storage structure accessible to one of the processing elements, rather than accessing the data in the memory 210. In the example of FIG. 2, the storage structure comprises one of the caches 214, 216, 218; however, it will be appreciated that in systems without caches, this could refer to any storage structure other than the memory 210, for example any storage structure on the same side of the interconnect 204 as at least one of the processor blocks 206 and/or data stored in the system cache 222 located within the interconnect 204.

The way in which a given stashing transaction indicates the cache to which it is to be routed may vary. In some examples, a steering tag may be used to indicate the cache to which the transaction should be routed.

Allowing transactions to be steered to the caches in this way, so that stashing transactions can cause data to be written directly to one of the caches, rather than to the memory 210, can improve the performance of the system. In particular, the latency associated with a subsequent access to that data by one of the processing elements can be reduced, since the data will already be present in the cache—for example, the latency associated with retrieving the data from memory can be avoided.

As shown in FIG. 2, the stashing circuitry 224 could be provided within the root port 202. However, it is also possible for the stashing circuitry 224 to be provided in a different location, such as within the interconnect 204 or between the interconnect 204 and the root port 202.

Figure 3:
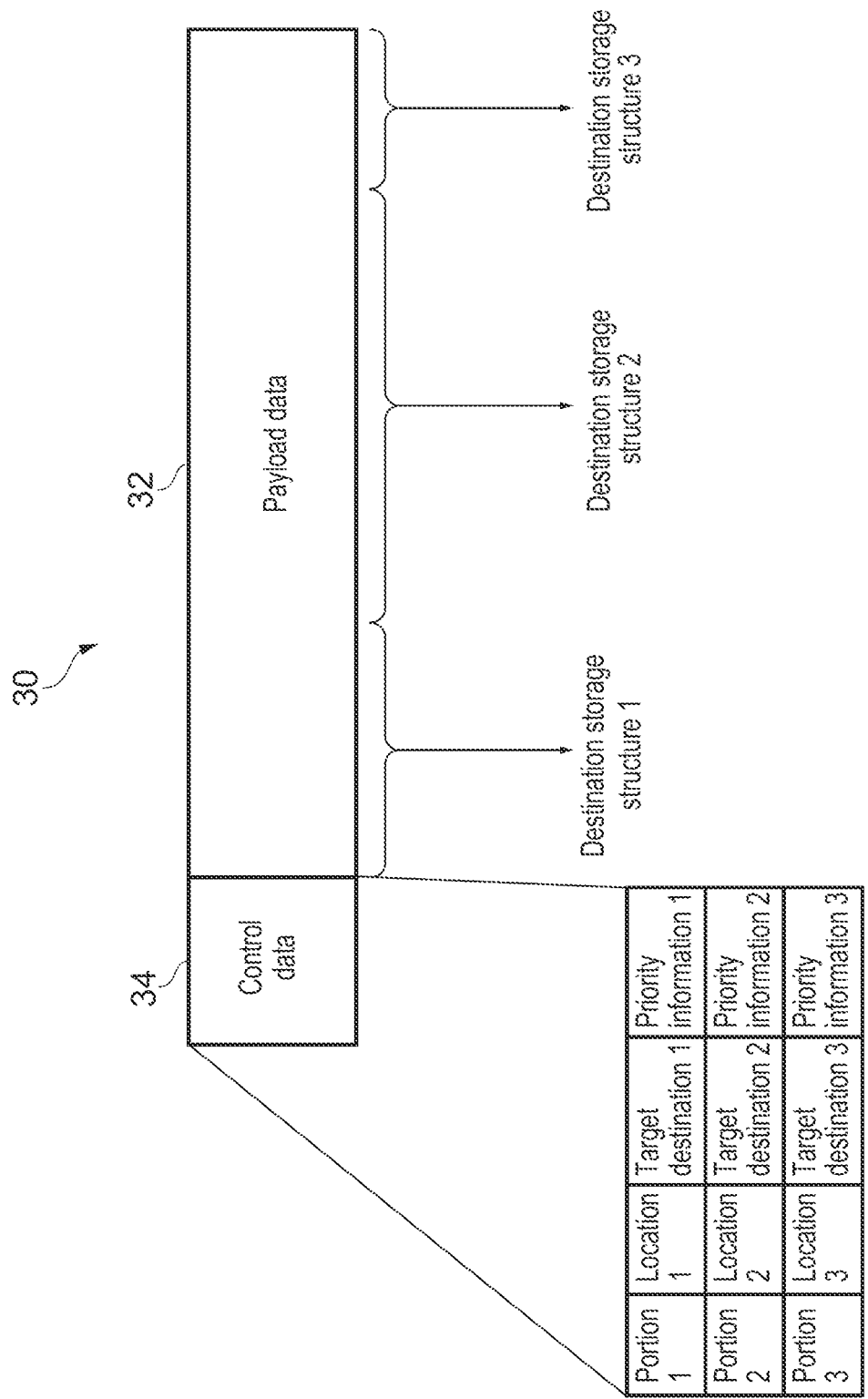
FIG. 3 schematically illustrates a stashing transaction according to various configurations of the present techniques.

One example of a format of a stashing transaction 30 is schematically illustrated in FIG. 3. The stashing transaction 30 comprises control data 34 and payload data 32. As has already been discussed, the stashing circuitry 224 is responsive to stashing transactions, such as the stashing transaction 30, for which the control data 34 indicates that the payload data comprises a plurality of portions. In the illustrated example, the control data 34 indicates that the payload data 32 comprises three different portions (portion 1, portion 2, and portion 3). Each portion is indicated through the control data 34 which encodes a location of that portion within the payload data 32, a target destination for that portion of the payload data 32 and priority information indicating a priority for storing that portion of the payload data 32 in a storage structure that can be accessed by a processing element identified in the target destination.

It should be appreciated that the illustrated example is but one possible example of control data and that the number of portions can be any number. Furthermore, the locations of the portions within the payload data 32 can be defined explicitly, through the inclusion of specific information in the control data 34 that identifies each portion. Alternatively, the locations of at least one portion of the payload data 32 may be defined implicitly, for example, as all bits of the payload data 32 which are not explicitly defined in the control data 34. Furthermore, the target destination and priority may be set for each portion or one or both of the destination and priority information may be defined globally for all portions of the payload data 32. Additionally, or alternatively, the target destination and the priority information for at least one portion of the payload data 32 may be implicit. For example, any portions for which a target destination or a priority is not defined may be assigned a default target destination or a default priority. Alternatively, the absence of priority information or target destination information for one or more portions of the payload data 32 may be interpreted as an indication that the corresponding portion is not to be stashed and, instead, is to be directed towards the memory 210.

Figure 4:
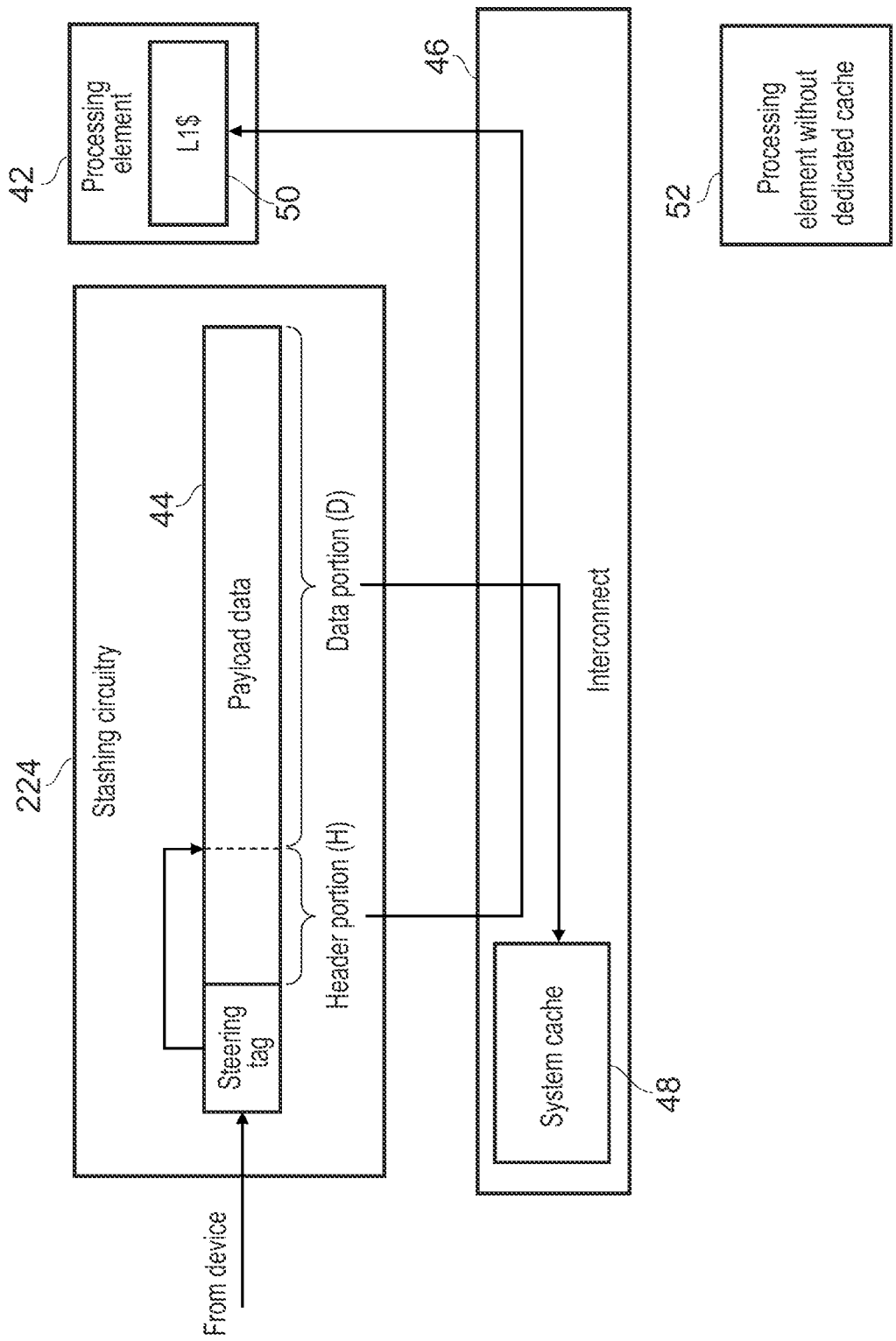
FIG. 4 schematically illustrates stashing circuitry according to various configurations of the present techniques.

FIG. 4 schematically illustrates stashing circuitry 224 receiving a specific stashing transaction 44 from a device (for example, from one of the devices 200 illustrated in FIG. 2). The stashing transaction 44 is in the format of a transaction layer packet according to the PCIe protocol. The stashing transaction 44 is provided with a steering tag which contains control data, and payload data which comprises a header portion (H) and a data portion (D). The control data indicated in the steering tag indicates an offset that defines a boundary in the payload data between the header portion H and the data portion D.

The stashing circuitry 224 interprets the control data and performs a first stashing decision operation to determine whether to stash the header portion H and, if so, where to stash the header portion H based on the control data. In the illustrated configuration the control data comprises information indicating a processing element 42 (which may be an example of a processing element 206 as illustrated in FIG. 2). The stashing circuitry 224 makes the stashing decision, for example, based on current system conditions relating to the storage structures that are accessible to the processing element 42. Based on the current system conditions, the stashing circuitry 224 directs the header portion H of the payload data to the L1 cache 50 of the processing element 42 via the interconnect 46.

The stashing circuitry 224 also interprets the control data and performs a second stashing decision operation to determine whether to stash the data portion D and, if so, where to stash the data portion D based on the control data. In the illustrated configurations, the control data comprises information indicating a processing element without a dedicated cache 52 (which may be an example of a processing element 228 as illustrated in FIG. 2). The stashing circuitry 224 makes the stashing decision, for example, based on current system conditions relating to the storage structures that are accessible to the processing element 52. As the processing element 52 does not have any dedicated caches, the stashing decision comprises determining whether to stash the data portion D in the system cache 48 which is accessible to the processing element without a dedicated cache 52 or whether to direct the data portion D to memory. In the illustrated configuration, the stashing circuitry 224 determines that, based on current system conditions, the data portion D is to be stashed and directs the data portion D to the system cache 48 via the interconnect 46.

Figure 5:
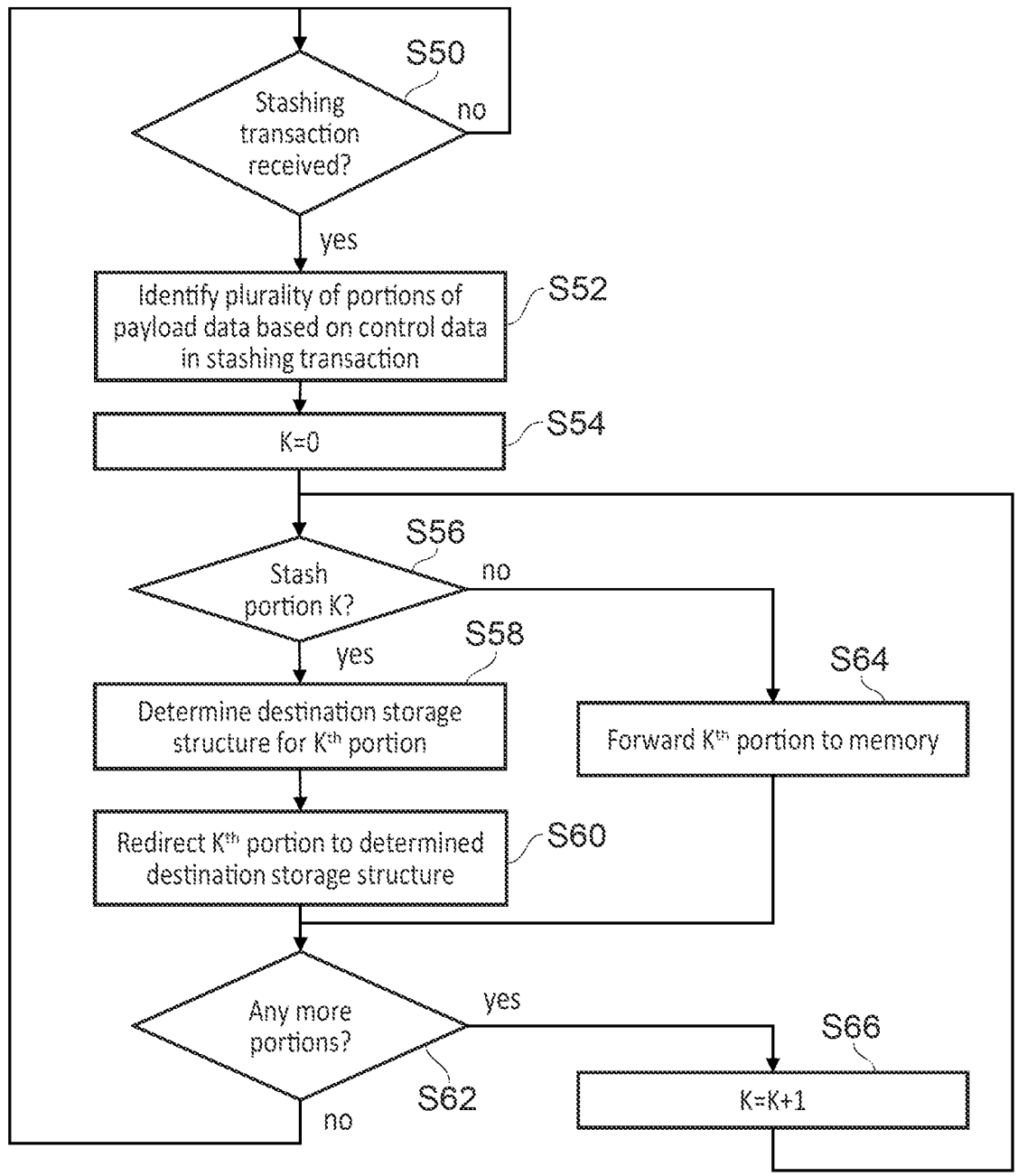
FIG. 5 schematically illustrates a sequence of steps carried out according to various configurations of the present techniques.

FIG. 5 schematically illustrates a sequence of steps that are carried out by the stashing circuitry 224 according to various configurations of the present techniques. Flow begins at step S50 where it is determined whether a stashing transaction has been received. If, at step S50, it is determined that no stashing transaction has been received then flow loops back to step S50 to continue to wait. If, at step S50, it was determined that a stashing transaction has been received then flow proceeds to step S52 where the stashing circuitry 224 identifies each of a plurality of portions of payload data based on control data that is comprised in the stashing transaction. Flow then proceeds to step S54 where a variable K is initialised to zero. Flow then proceeds to step S56 where the stashing circuitry 224 determines whether portion K is to be stashed or not. If, at step S56, it is determined that portion K is not to be stashed, then flow proceeds to step S64 where the $K^{th}$ portion of the payload data (as identified by the control data) is forwarded to memory, for example, as a regular store request. Flow then proceeds to step S62. If, at step S56, it was determined that portion K was to be stashed, then flow proceeds to step S58 where a destination storage structure for the $K^{th}$ portion of the payload data is determined. The destination storage structure may be specified in the control data or may be determined from one or more storage structures that are accessible to a processing element identified in the control data. Flow then proceeds to step S60 where the $K^{th}$ portion of the payload data is directed (forwarded) to the destination storage structure before flow proceeds to step S62. At step S62 it is determined whether or not there are any more portions of the payload data to be considered for stashing. If, at step S62, it is determined that there are no more portions of payload data to be stashed, then flow returns to step S50 to wait for another stashing transaction. If, at step S62, it was determined that there are further portions of payload data that are to be considered for stashing, then flow proceeds to step S66 where K is incremented before flow returns to step S56.

Whilst the steps set out in relation to FIG. 5 are illustrated sequentially with each portion of payload data being considered for stashing in turn, it would be readily apparent to the skilled person that one or more portions of payload data could be considered for stashing in parallel and that the counter K is provided for illustrative purpose to indicate that each portion of the plurality of portions of payload data is considered in an independent stashing decision operation.

Figure 6:
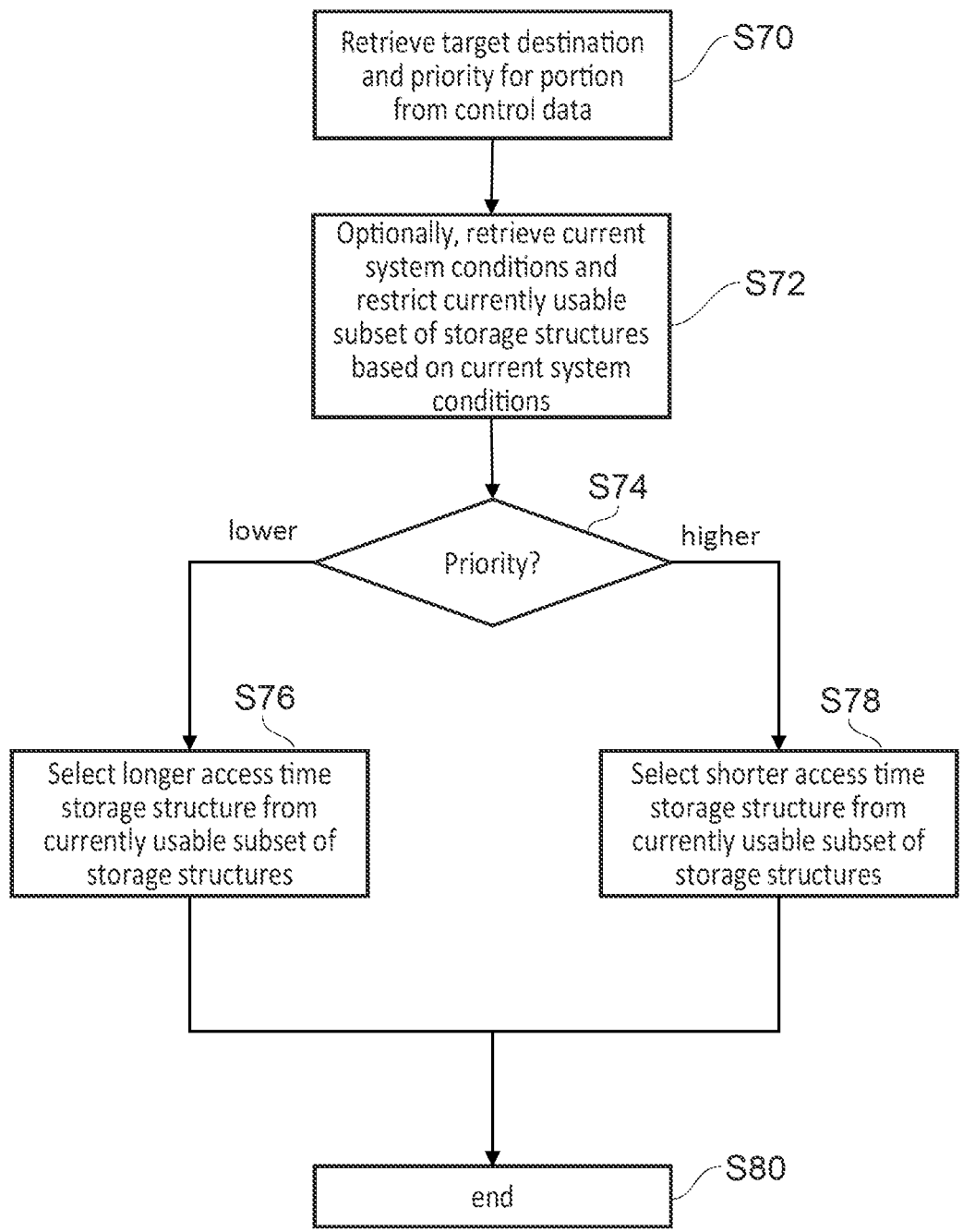
FIG. 6 schematically illustrates a sequence of steps carried out according to various configurations of the present techniques.

FIG. 6 schematically illustrates details of steps carried out by the stashing circuitry 224 at step S58 of FIG. 5 in order to determine a destination storage structure. Flow begins at step S70 where the stashing circuitry 224 retrieves target destination and priority information for the portion that is currently being considered from the control data. Flow then proceeds to step S72 where the stashing circuitry optionally retrieves the current system conditions and any restrictions on currently usable storage structures that are accessible to the target destination. Flow then proceeds to step S74 where the priority of the stashing transaction for that portion of the payload data is determined. If, at step S74, it is determined that the priority is lower, then flow proceeds to step S76 where the stashing circuitry 224 selects a storage structure that is accessible to the target destination but that has a longer access time that other storage structures that are accessible to the target destination. For example, referring back to FIG. 2, the stashing circuitry 224 may determine that each of the system cache 204, the L2 cache 218 and the L1 caches 214, 216 are currently usable storage structures and that the system conditions are such that each of the caches has relatively low load and has relatively high available storage space. In such a situation, the stashing circuitry may select the L2 cache as a longer access time storage structure. Flow then proceeds to step S80 where the selection process ends. On the other hand, if at step S74, it is determined that the priority is a higher priority, then flow proceeds to step S78 where a shorter access time storage structure, for example, the L1 cache 214, 216 illustrated in FIG. 2, to direct that portion of the payload data to. As a further example, if at step S72, it had been determined that the relevant L1 cache 214, 216 that is accessible to the target destination is busy or otherwise does not comprise one of the currently usable subset of storage structures, then the stashing circuitry 224 may select the L2 cache 218 illustrated in FIG. 2 as a stashing location to direct that portion of the payload data to. Flow then proceeds to step S80 where the selection process ends. It is noted that, in step S74, the decision is illustrated as a binary decision with a lower priority and a higher priority. However, the priority could alternatively take one of a range of possible values with lower priority stashing transactions being associated with longer access time storage structures and higher priority stashing transactions being associated with shorter access time storage structures.

Figure 7:
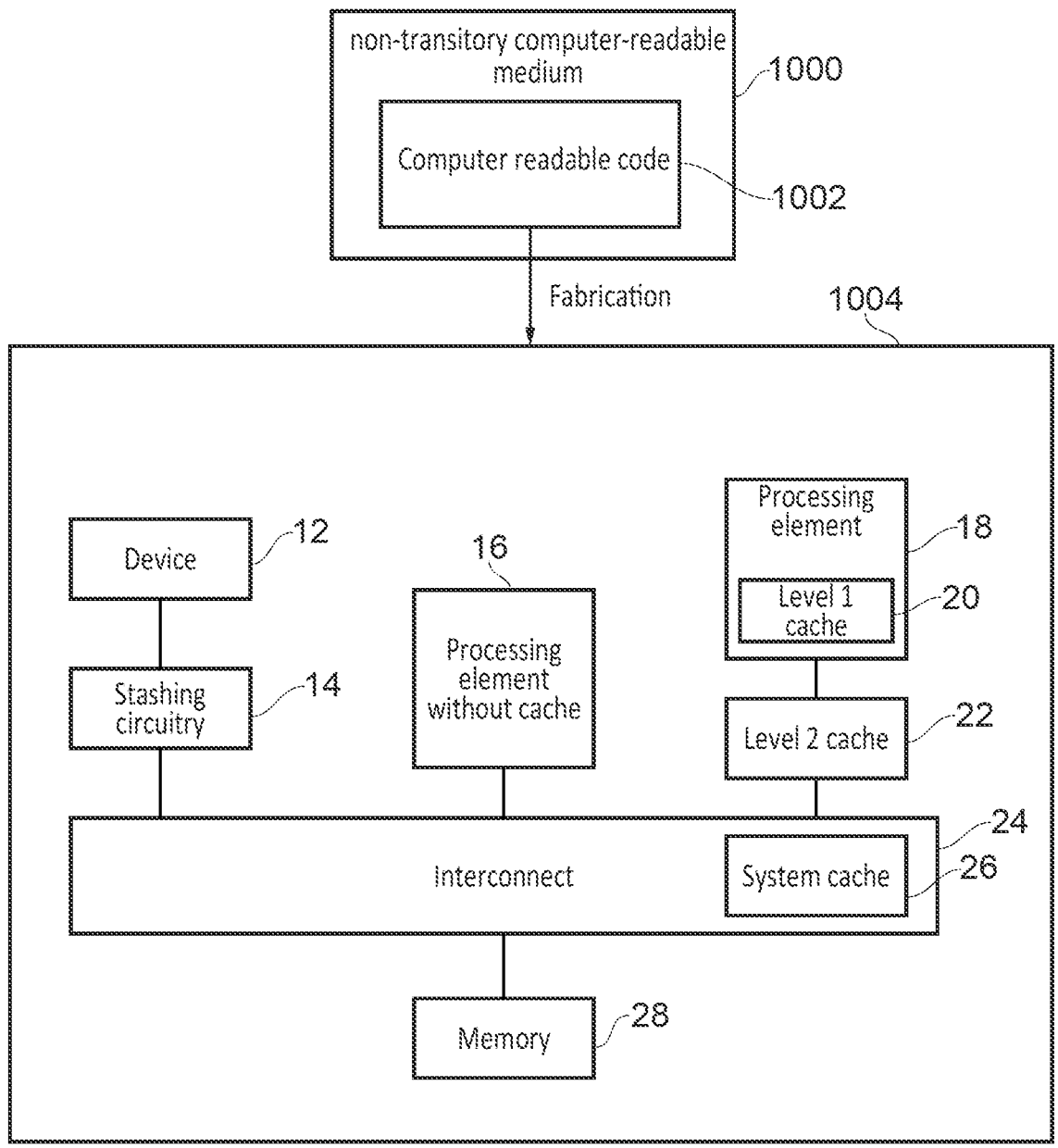
FIG. 7 schematically illustrates fabrication of an apparatus according to various configurations of the present techniques.

FIG. 7 schematically illustrates a non-transitory computer-readable medium comprising computer readable code for fabrication of a data processing apparatus according to various configurations of the present techniques. Fabrication is carried out based on computer readable code 1002 that is stored on a non-transitory computer-readable medium 1000. The computer-readable code can be used at one or more stages of a semiconductor design and fabrication process, including an electronic design automation (EDA) stage, to fabricate an integrated circuit comprising the apparatus embodying the concepts. The fabrication process involves the application of the computer readable code 1002 either directly into one or more programmable hardware units such as a field programmable gate array (FPGA) to configure the FPGA to embody the configurations described hereinabove or to facilitate the fabrication of an apparatus implemented as one or more integrated circuits or otherwise that embody the configurations described hereinabove. By way of example, the fabricated design 1004 may comprise the apparatus illustrated in FIG. 1 incorporating stashing circuitry 14, processing element 18, processing element without a dedicated cache 16, interconnect 24, memory 28, level 2 cache 22, and a device 12. However, the fabricated design may correspond to any of the circuits described in FIG. 1, 2, or 4, configured to perform the steps described in relation to FIGS. 5 and 6.

In brief overall summary there is provided an apparatus, method, and computer readable medium. The apparatus comprises interconnect circuitry to couple a device to one or more processing elements and to one or more storage structures. The apparatus also comprises stashing circuitry configured to receive stashing transactions from the device, each stashing transaction comprising payload data and control data. The stashing circuitry is responsive to a given stashing transaction whose control data identifies a plurality of portions of the payload data, to perform a plurality of independent stashing decision operations, each of the plurality of independent stashing decision operations corresponding to a respective portion of the plurality of portions of payload data and comprising determining, with reference to the control data, whether to direct the respective portion to one of the one or more storage structures or whether to forward the respective portion to memory.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Some example configurations are set out in the following numbered clauses:

Clause 1. An apparatus comprising:
  interconnect circuitry to couple a device to one or more processing elements and to one or more storage structures; and
  stashing circuitry configured to receive stashing transactions from the device, each stashing transaction comprising payload data and control data;
  wherein the stashing circuitry is responsive to a given stashing transaction whose control data identifies a plurality of portions of the payload data, to perform a plurality of independent stashing decision operations, each of the plurality of independent stashing decision operations corresponding to a respective portion of the plurality of portions of payload data and comprising determining, with reference to the control data, whether to direct the respective portion to one of the one or more storage structures or whether to forward the respective portion to memory.

Clause 2. The apparatus of clause 1, wherein:
  the control data of the given stashing transaction comprises portion identifying information indicating each of the plurality of portions of payload data; and the stashing circuitry is configured to identify each of the plurality of portions based on the portion identifying information.

Clause 3. The apparatus of clause 1 or clause 2, wherein:
  the control data comprises destination identifying information indicating a target destination for one or more of the plurality of portions of payload data; and
  the stashing circuitry is configured, for each of the plurality of independent stashing decision operations that determines that the respective portion is to be directed to one of the one or more of storage structures, to determine, based on the destination identifying information, a particular storage structure of the one or more storage structures to which the respective portion is to be directed.

Clause 4. The apparatus of clause 3, wherein:
the target destination identifies a processing element of the one or more processing elements that is expected to process the portion of the payload data; and
the stashing circuitry is configured to determine, as the particular storage structure, a storage structure of the one or more storage structures that is accessible to the processing element.

Clause 5. The apparatus of clause 3 or clause 4, wherein the stashing circuitry is configured to perform each of the plurality of independent stashing decision operations based on current system conditions.

Clause 6. The apparatus of clause 5, wherein the stashing circuitry is configured, for each of the plurality of independent stashing decision operations that determines that the respective portion is to be directed to one of the one or more storage structures, to determine the particular storage structure based on the current system conditions.

Clause 7. The apparatus of any of clauses 3 to 6, wherein:
the control data comprises priority information indicating a stashing priority for one or more of the plurality of portions of payload data; and the stashing circuitry is configured, when performing a respective stashing decision operation for the respective portion, to take into account any stashing priority provided for that respective portion.

Clause 8. The apparatus of clause 7, wherein the stashing circuitry is configured, for each of the plurality of portions for which the stashing priority indicates a lowest priority, to forward that portion to the memory.

Clause 9. The apparatus of clause 7 or clause 8, wherein the stashing circuitry is configured, when performing each of the plurality of independent stashing decision operations for which a stashing priority is indicated for the respective portion, to determine the particular storage structure based on the stashing priority.

Clause 10. The apparatus of any of clauses 7 to 9 when dependent on clause 4, wherein:
the one or more storage structures comprises a plurality of storage structures;
the stashing priority is one of a higher priority or a lower priority;
the processing element is coupled to a subset of the plurality of storage structures, each accessible to the processing element within a corresponding access time;
the subset of the one or more storage structures comprises one or more shorter access time storage structures and one or more longer access time storage structures, the shorter access time storage structures having a shorter corresponding access time than the longer access time storage structures; and the stashing circuitry is configured, when performing each of the plurality of independent stashing decision operations for which a stashing priority is indicated for the respective portion, and when the stashing priority is the higher priority, to select, as the particular storage structure, one of the one or more shorter access time storage structures.

Clause 11. The apparatus of clause 10, wherein the stashing circuitry is configured, when performing each of the plurality of independent stashing decision operations for which a stashing priority is indicated for the respective portion, and when the stashing priority is the lower priority, to select, as the particular storage structure, one of the one or more longer access time storage structures.

Clause 12. The apparatus of clause 10 or clause 11, wherein the stashing circuitry is configured to determine a currently usable subset of storage structures comprising each of the subset of the plurality of storage structures for which a predetermined condition is met, and to select the particular storage structure from the currently usable subset of storage structures.

Clause 13. The apparatus of any preceding clause, wherein:
the payload data comprises a header portion and a data portion; and
the stashing circuitry is arranged to determine a first storage structure of the one or more storage structures accessible by a first processing element of the one or more processing elements anticipated to process the header portion, and a second storage structure of the one or more storage structures accessible by a second processing element of the one or more processing elements anticipated to process the data portion, based on the control data, to store the header portion in the first storage structure, and to store the data portion in the second storage structure.

Clause 14. The apparatus of any preceding clause, wherein the device is a Peripheral Component Interconnect Express (PCIe) device and the stashing transaction is a PCIe transaction layer packet.

Clause 15. The apparatus of clause 14, wherein the control data is stored in a PCIe steering tag of the transaction layer packet.

Clause 16. The apparatus of clause 15, wherein the PCIe steering tag encodes information indicative of a stashable portion of the payload data and the stashing circuitry is configured to stash the stashable portion of the payload data in a first storage structure determined from the control data and to store each remaining bit of the payload data in a second storage structure determined from the control data.

Clause 17. The apparatus of any preceding clause, wherein the apparatus is a system on chip and the device is an off-chip device external to the system on chip.

We claim:

1. An apparatus comprising:
interconnect circuitry to couple a device to one or more processing elements and to one or more storage structures; and
stashing circuitry configured to receive stashing transactions from the device, each stashing transaction comprising payload data and control data;
wherein the stashing circuitry is responsive to a given stashing transaction whose control data identifies a plurality of portions of the payload data, to perform a plurality of independent stashing decision operations, each of the plurality of independent stashing decision operations corresponding to a respective portion of the plurality of portions of payload data and comprising determining, with reference to the control data, whether to direct the respective portion to one of the one or more storage structures or whether to forward the respective portion to memory.

2. The apparatus of claim 1, wherein:
the control data of the given stashing transaction comprises portion identifying information indicating each of the plurality of portions of payload data; and
the stashing circuitry is configured to identify each of the plurality of portions based on the portion identifying information.

3. The apparatus of claim 1, wherein:
the control data comprises destination identifying information indicating a target destination for one or more of the plurality of portions of payload data; and
the stashing circuitry is configured, for each of the plurality of independent stashing decision operations that determines that the respective portion is to be directed to one of the one or more of storage structures, to determine, based on the destination identifying information, a particular storage structure of the one or more storage structures to which the respective portion is to be directed.

4. The apparatus of claim 3, wherein:
the target destination identifies a processing element of the one or more processing elements that is expected to process the portion of the payload data; and
the stashing circuitry is configured to determine, as the particular storage structure, a storage structure of the one or more storage structures that is accessible to the processing element.

5. The apparatus of claim 3, wherein the stashing circuitry is configured to perform each of the plurality of independent stashing decision operations based on current system conditions.

6. The apparatus of claim 5, wherein the stashing circuitry is configured, for each of the plurality of independent stashing decision operations that determines that the respective portion is to be directed to one of the one or more storage structures, to determine the particular storage structure based on the current system conditions.

7. The apparatus of claim 3, wherein:
the control data comprises priority information indicating a stashing priority for one or more of the plurality of portions of payload data; and
the stashing circuitry is configured, when performing a respective stashing decision operation for the respective portion, to take into account any stashing priority provided for that respective portion.

8. The apparatus of claim 7, wherein the stashing circuitry is configured, for each of the plurality of portions for which the stashing priority indicates a lowest priority, to forward that portion to the memory.

9. The apparatus of claim 7, wherein the stashing circuitry is configured, when performing each of the plurality of independent stashing decision operations for which a stashing priority is indicated for the respective portion, to determine the particular storage structure based on the stashing priority.

10. The apparatus of claim 7, wherein:
the target destination identifies a processing element of the one or more processing elements that is expected to process the portion of the payload data;
the stashing circuitry is configured to determine, as the particular storage structure, a storage structure of the one or more storage structures that is accessible to the processing element;
the one or more storage structures comprises a plurality of storage structures;
the stashing priority is one of a higher priority or a lower priority;
the processing element is coupled to a subset of the plurality of storage structures, each accessible to the processing element within a corresponding access time;
the subset of the one or more storage structures comprises one or more shorter access time storage structures and one or more longer access time storage structures, the shorter access time storage structures having a shorter corresponding access time than the longer access time storage structures; and
the stashing circuitry is configured, when performing each of the plurality of independent stashing decision operations for which a stashing priority is indicated for the respective portion, and when the stashing priority is the higher priority, to select, as the particular storage structure, one of the one or more shorter access time storage structures.

11. The apparatus of claim 10, wherein the stashing circuitry is configured, when performing each of the plurality of independent stashing decision operations for which a stashing priority is indicated for the respective portion, and when the stashing priority is the lower priority, to select, as the particular storage structure, one of the one or more longer access time storage structures.

12. The apparatus of claim 10, wherein the stashing circuitry is configured to determine a currently usable subset of storage structures comprising each of the subset of the plurality of storage structures for which a predetermined condition is met, and to select the particular storage structure from the currently usable subset of storage structures.

13. The apparatus of claim 1, wherein:
the payload data comprises a header portion and a data portion; and
the stashing circuitry is arranged to determine a first storage structure of the one or more storage structures accessible by a first processing element of the one or more processing elements anticipated to process the header portion, and a second storage structure of the one or more storage structures accessible by a second processing element of the one or more processing elements anticipated to process the data portion, based on the control data, to store the header portion in the first storage structure, and to store the data portion in the second storage structure.

14. The apparatus of claim 1, wherein the device is a Peripheral Component Interconnect Express (PCIe) device and the stashing transaction is a PCIe transaction layer packet.

15. The apparatus of claim 14, wherein the control data is stored in a PCIe steering tag of the transaction layer packet.

16. The apparatus of claim 15, wherein the PCIe steering tag encodes information indicative of a stashable portion of the payload data and the stashing circuitry is configured to stash the stashable portion of the payload data in a first storage structure determined from the control data and to store each remaining bit of the payload data in a second storage structure determined from the control data.

17. The apparatus of claim 1, wherein the apparatus is a system on chip and the device is an off-chip device external to the system on chip.

18. A method of operating an apparatus comprising interconnect circuitry to couple a device to one or more processing elements and to one or more storage structures, the method comprising:
receiving stashing transactions from the device, each stashing transaction comprising payload data and control data; and
performing, in response to a given stashing transaction whose control data identifies a plurality of portions of the payload data, a plurality of independent stashing decision operations, each of the plurality of independent stashing decision operations corresponding to a respective portion of the plurality of portions of payload data and comprising determining, with reference to the control data, whether to direct the respective portion to one of the one or more storage structures or whether to forward the respective portion to memory.

19. A non-transitory computer-readable medium to store computer-readable code for fabrication of an apparatus comprising:

interconnect circuitry to couple a device to one or more processing elements and to one or more storage structures; and stashing circuitry configured to receive stashing transactions from the device, each stashing transaction comprising payload data and control data;

wherein the stashing circuitry is responsive to a given stashing transaction whose control data identifies a plurality of portions of the payload data, to perform a plurality of independent stashing decision operations, each of the plurality of independent stashing decision operations corresponding to a respective portion of the plurality of portions of payload data and comprising determining, with reference to the control data, whether to direct the respective portion to one of the one or more storage structures or whether to forward the respective portion to memory.

* * * * *